(12) United States Patent
Young et al.

(10) Patent No.: US 8,239,165 B1
(45) Date of Patent: Aug. 7, 2012

(54) ULTRA-FAST DETERMINATION OF QUANTUM EFFICIENCY OF A SOLAR CELL

(75) Inventors: David L. Young, Golden, CO (US); Brian Egaas, Golden, CO (US); Pauls Stradins, Golden, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 973 days.

(21) Appl. No.: 12/237,452

(22) Filed: Sep. 25, 2008

Related U.S. Application Data

(60) Provisional application No. 60/975,852, filed on Sep. 28, 2007.

(51) Int. Cl.
*G06F 11/30* (2006.01)
*G06F 11/00* (2006.01)

(52) U.S. Cl. ......... 702/182; 702/183; 702/188; 702/189

(58) Field of Classification Search ............... 702/57–67, 702/182–189
See application file for complete search history.

(56) References Cited

U.S. PATENT DOCUMENTS

| | | | |
|---|---|---|---|
| 5,475,221 A | 12/1995 | Wang | |
| 6,154,034 A | 11/2000 | Lovelady et al. | |
| 6,317,207 B2 | 11/2001 | French et al. | |
| 7,067,831 B2 | 6/2006 | Ahrens et al. | |
| 7,309,850 B2 | 12/2007 | Sinton et al. | |
| 7,348,581 B2 | 3/2008 | March et al. | |
| 7,387,405 B2 | 6/2008 | Ducharme et al. | |
| 7,411,408 B2 | 8/2008 | Shimotomai et al. | |
| 7,989,729 B1 * | 8/2011 | Zhao et al. | 219/121.76 |
| 2004/0020529 A1 * | 2/2004 | Schutt et al. | 136/245 |
| 2008/0088829 A1 | 4/2008 | Fuyuki | |
| 2008/0115830 A1 | 5/2008 | Shin et al. | |

* cited by examiner

*Primary Examiner* — Phuong Huynh
(74) *Attorney, Agent, or Firm* — Paul J. White; W. LaNelle Owens; John C. Stolpa

(57) ABSTRACT

An apparatus for measuring quantum efficiency (QE) of solar cells. The apparatus includes a light source including an array of light emitting diodes (LEDs) that each emit light corresponding to a differing portion of a test spectrum and each LED is driven by a sinusoidal power supply that operates at a unique frequency. The light source includes an optical coupling focusing the LED light into a test beam targeted on a solar cell, and a signal conditioner converts analog current signals generated by the solar cell into digital voltage signals. A QE measurement module determines a QE value corresponding to each of the LEDs based on the digital voltage signals using a Fast Fourier Transform module that processes the digital voltage signals to generate values for each operating frequency. The QE measurement module determines the QE values by applying a conversion factor to these values. Since all the LEDs can be power-modulated simultaneously and the corresponding cell responses to each of the LEDS can be analyzed simultaneously, the QE spectrum measurement time is greatly shortened as compared to conventional methods.

26 Claims, 6 Drawing Sheets

ULTRA-FAST DETERMINATION OF QUANTUM EFFICIENCY OF A SOLAR CELL

CROSS-REFERENCE TO RELATED APPLICATIONS

This application claims the benefit of U.S. Provisional Application No. 60/975,852, filed Sep. 28, 2007, which is incorporated herein by reference in its entirety

CONTRACTUAL ORIGIN

The United States Government has rights in this invention under contact No. DE-AC36-99GO10337 between the United States Department of Energy and the National Renewable Energy Laboratory, a Division of the Midwest Research Institute.

BACKGROUND

Recently, there has been a significant increase in the demand for renewable energy sources with solar energy being viewed as one of the most reliable and readily available of such energy sources. The renewable energy industry has attempted to meet these demands with improved photovoltaic (PV) or solar cells that are less expensive to manufacture, are more reliable in varied use environments, and are more efficient in converting solar energy into electricity. For example, higher efficiency crystalline silicon solar cells are under development, as are lower cost, thin-film solar cells. As materials research and cell design progresses, it is important to be able to accurately test manufactured solar cells to determine whether the materials should be pursued and whether a new design is useful for meeting its intended function.

Regardless of the design and active material used, solar or PV cells are generally subjected to the same standard tests including a test to determine quantum efficiency (QE) of the cell. Quantum efficiency indicates the ratio of the number of charge carriers or electrons generated and collected by the solar cell to the number of photons incident on a solar cell. A QE measurement is critical during cell research and manufacture because cell QE provides an accurate indication of whether a cell is properly designed or operating with an optimal desired spectral response. Such detailed information is obtained with a QE measurement, typically obtained for a full spectrum of light ranging from light in the ultraviolet (UV) range to light in the infrared (IR) range. A graph of the QE measurement at various wavelengths in the light spectrum is useful for indicating if the cell is operating as desired or with a desired spectral response. For example, if the cell's spectral response is suppressed over large portions of the visible light spectrum where the intensity from the sun is high, the tested cell likely cannot convert light to energy with a desired or high efficiency. Based on the QE measurements, solar cell designers can identify material or design defects and can modify the manufacturing process and/or cell design to produce high efficiency solar or PV cells.

The measurement of QE of a solar cell is presently a slow process requiring relatively expensive test stations or equipment. In conventional QE measurements, a meter such as an ammeter is connected to a solar cell to determine generation of charge carriers or electron flow in response to light striking the solar cell. The light or photons are provided in a controlled manner with a light source that includes a white light source, a monochromator, and optical components such as mirrors that direct light from the monochromator onto a small (e.g., 1 to 3 mm$^2$) area of the cell. The monochromator is a relatively expensive device that includes a grating or prism or set of filters for separating the white light into a plurality of wavelengths representing the full light spectrum (e.g., a simulator of standard sunlight of an air mass of 1.5 or AM1.5). A slit at the output of the monochromator is then typically used to restrict the optical path such that only light at or near a particular wavelength is directed toward the mirror and ultimately onto the solar cell. The grating is moved by a motor to disperse in a step-wise manner each of the wavelengths of the light exiting the monochromator slit.

In this manner, the current measurement by the ammeter can be used to determine the QE in a serial manner as each individual wavelength or wavelength range is provided individually by the monochromator. The motor on the monochromator has to provide very accurate movements or control over grating or filter or prism for the light source to provide light one wavelength at a time, and these and other factors result in a typical monochromator used for QE measurement being expensive to purchase and maintain. Additionally, the use of a monochromator results in a relatively slow QE measurement as the monochromator is operated to focus each portion of a full spectrum onto the solar cell followed by determination of the QE at that particular wavelength. A conventional QE measurement may take up to twenty minutes or more to complete. Hence, there is an ongoing demand for less time-consuming techniques for determining the QE of solar or PV cells that are also less expensive to implement.

Additionally, a faster measurement of QE enables a spatial scanning of spectral response properties over a large area of a solar cell. In this way, maps of QE over all or part of a solar cell's area may be produced. Such characterization can identify both systematic and random defects associated with solar cell materials processing, and can be critical in improving the manufacturing yield as part of statistical process controls.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods that are meant to be exemplary and illustrative, not limiting in scope. In various embodiments, one or more of the above-described problems have been reduced or eliminated, while other embodiments are directed to other improvements.

This is achieved, in part, by providing an optical spectroscopy system that may be utilized to perform ultra-fast determinations or measurements of characteristics of a test object. In one embodiment, the optical spectroscopy method is used to determine the quantum efficiency (QE) of a solar or PV cell, and the determination is performed in less than a minute and more typically in a few seconds or less (such as in less than 1 second) rather than in a period of up to 20 or more minutes as was the case with prior QE measurement devices. With regard to QE measurements, the system includes a unique light source that can produce multiple wavelengths concurrently that can later be independently processed to determine QE at each of these wavelengths. To this end, the light source in one embodiment includes an array of light emitting diodes (LEDs) rather than the standard white light source provided by a single halogen light bulb. The LEDs are selected for their ability to generate or transmit light at a particular wavelength (or wavelength range) such that the combined LEDs are useful for simulating the full spectrum of sunlight (e.g., an air mass (AM) of 1.5 on earth). The number of LEDs used in the array may vary such as 2 to 10 LEDs up to 60 or more LEDs in some arrays, and, in one embodiment, 10 LEDs operating to generate light with wavelengths ranging from the UV to the IR wavelengths or wavelength ranges have produced acceptable results. To allow the LEDs to be separately analyzed or processed, a power source is used to individually drive each LED at its own unique operating or ON/OFF frequency, and typically not being a multiple of another of the operating frequencies. The power source typically is a modulated power supply with some embodiments using a sinusoidal-wave modulated power supply while another example includes a square-wave modulated power supply. The light source can be thought of as an electronically-controlled, full-spectrum light source that provides a plurality of light beams at pulses or operating frequencies that are unique and may include sources other than LEDs such as solid state and other lasers. The light source can also operate in the constantly ON mode too, where all or some of the LEDs are constantly on.

During a QE measurement of a solar cell, all of the LEDs in the array are driven "concurrently" to illuminate the solar cell. The AC current generated in the solar cell from the light transmitted by the light source is signal processed or conditioned such that it is amplified and converted into a digital voltage signal (e.g., a signal made up of the individual signals corresponding to the unique operating frequency of each LED in the LED array). The use of sinusoidal power supplies expedites the use of a Fast Fourier Transform (FFT) module or algorithm to be run by a computer processor (or in part by hardware) to determine the power spectrum of the current in the solar cell as a function of drive frequency from each LED light. In other words, the voltage waveform associated with each operating frequency (and, therefore, each LED or light wavelength provided by the array) is converted into an amplitude associated with each drive frequency or LED. A reference cell may be used to calibrate the amplitude of the FFT signals such that QE measurement module may be run by the computer processor to calculate a QE value for each operating frequency or LED or light wavelength by applying a conversion factor obtained through use of the reference cell to each amplitude, and the QE measurement module may generate and display a QE curve. It is a significant improvement for the measurement system to perform the QE measurement in parallel or concurrently for all frequencies of light provided by the source array rather than in series as was done in conventional QE systems. This results in a very large reduction in the determination time, e.g., from 20 minutes down to about 1 second or less.

By way of example, but not limitation, an embodiment provides an apparatus for measuring QE of a solar cell. The apparatus includes a light source including an array of LEDs in which each LED emits light corresponding to a differing portion of a test spectrum. For example, the test spectrum may be the full spectrum associated with sunlight and the LEDs are selected in number and color to represent this full spectrum (e.g., up to 10 or more LEDs such as up to 60 LEDs that range in light having a wavelength in the UV range or corresponding to UV light to light having a wavelength in the IR range or corresponding to IR light). The light source also includes an optical coupling that focuses the LED light or light beams into a test beam, which can be targeted on a solar cell. The apparatus further includes a signal conditioning assembly that receives analog current signals generated by the solar cell in response to the test beam striking its surface, and the signal conditioning assembly converts these signals into digital voltage signals. These digital signals are fed into the QE determination system that is in communication with the conditioning assembly, and the QE determination system includes a processor running a QE measurement module, which determines a QE value corresponding to each of the LEDs based on the digital voltage signals.

The light source further includes a power source having a sinusoidal power supply coupled to each of the LEDs such that each of these power supplies operates at a unique operating frequency to drive the LEDs at differing and identifiable frequencies. The emitted light intensity of each LED has a sinusoidal shape as a function of time. The QE determination system also includes a frequency spectrum analyzer that processes the digital voltage signals to generate values with amplitudes associated with each of the operating frequencies. For example, in one embodiment, the frequency spectrum analyzer is a software module run by the processor that applies a Fast Fourier Transform (FFT) to the digital voltage signals to produce the values or spikes for each operating frequency. The QE measurement module may determine the QE values by applying a conversion factor (e.g., one or more constants obtained by testing a reference cell prior to testing the solar cell) to the values or amplitudes output by the FFT module. In other embodiments, other techniques are used to obtain the frequency spectrum of the cell response (and, thus, the QE spectrum). For example, the frequency spectrum analyzer may be fully or partially analog to detect the cell's response to individual LEDs, e.g., using frequency filters (similar to resonant contours used in tuning into radio stations) that tune into each frequency and detect the cell response to individual LEDs.

According to another embodiment or aspect, a light source is provided that can be used in testing solar cells and in other optical spectroscopy applications. The light source includes an array of LEDs each emitting light corresponding with a differing portion of a test spectrum. The light source also includes a power supply including a sinusoidal power supply coupled to each of the LEDs and operating at a unique operating frequency to drive the LEDs. The test spectrum may be the full spectrum and the array of LEDs may include 10 LEDs emitting light ranging from UV light to IR light. The operating frequencies typically are not multiples of each other. Further, the unique operating frequencies may be selected such that a response (e.g., the digital voltage signal) has a period of at least about 1 milliseconds (e.g., is more than the carrier life time of a tested subject such as a high quality solar cell). The sinusoidal power supplies are in some cases configured such that they may be operated to selectively vary power levels delivered to select ones of the LEDs to choose the intensity of the light emitted from the LEDS such that the test spectrum can be matched to a particular spectrum (e.g., full sun spectrum on Earth, an anticipated spectrum in space or on a particular planet, or the like).

In addition to the exemplary aspects and embodiments described above, further aspects and embodiments will become apparent by reference to the drawings and by study of the following descriptions.

BRIEF DESCRIPTION OF THE DETAILED DRAWINGS

Exemplary embodiments are illustrated in referenced figures of the drawings. It is intended that the embodiments and figures disclosed herein are to be considered illustrative rather than limiting.

DESCRIPTION

Figure 1:
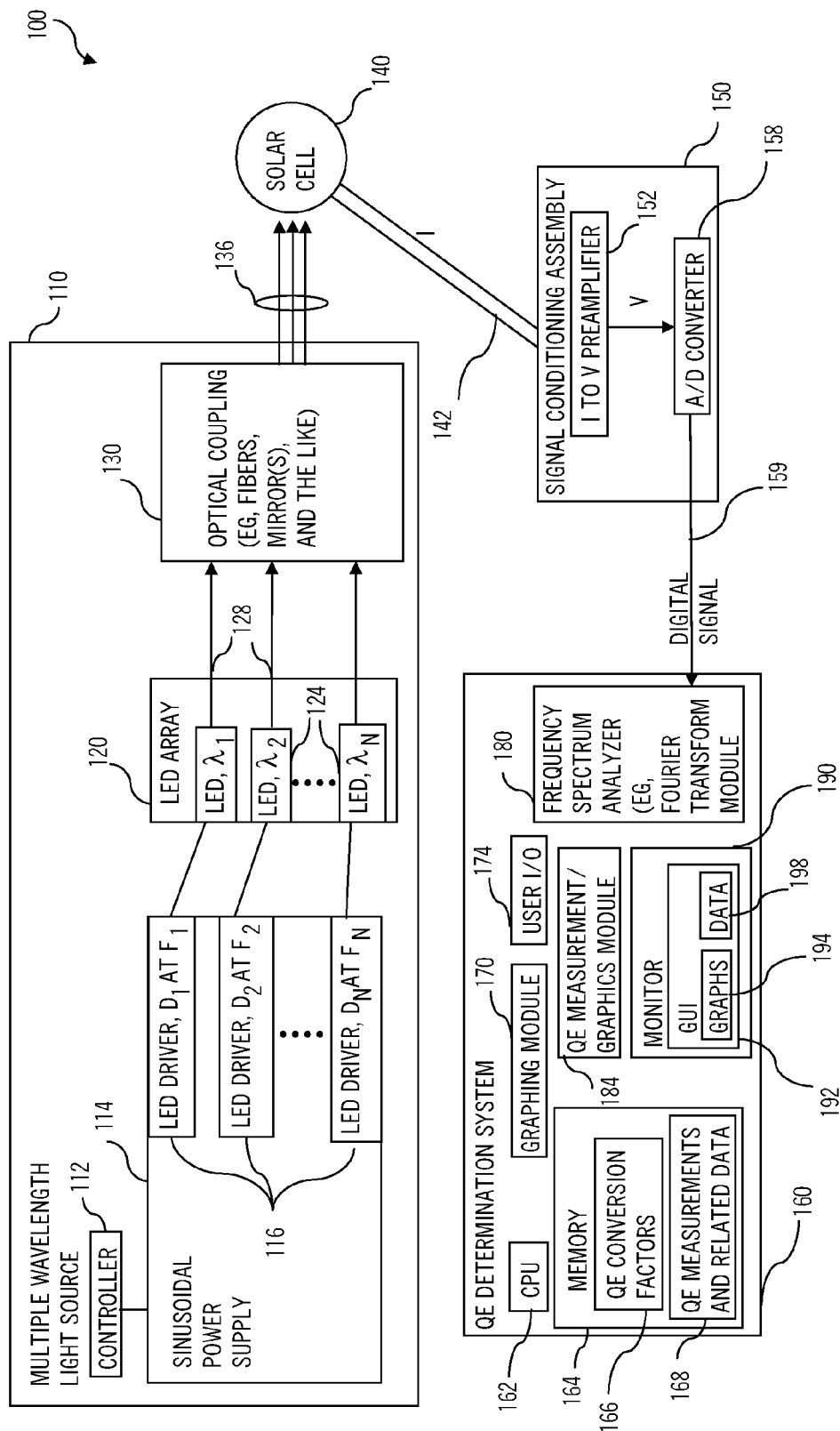
FIG. 1 is a functional block diagram of one exemplary embodiment of a system for determining QE for a solar cell.

FIG. 1 illustrates in functional block form a QE measurement system 100 that is useful for performing ultra-fast determinations of QE for a solar cell. The system 100 includes an electronically-controlled, multiple wavelength, light source 110 that is used to generate or disperse a test beam 136 made up of a plurality of light beams used to represent a desired spectrum. For example, the test beam 136 may be used to test a solar cell 140 with a standard full spectrum such as at AM1.5 or be used to test a different spectrum such as that might be found in space (e.g., AM0), on another planet (e.g., 0 to AM1.5 or the like), or in differing light environments. Further, the intensity of the test beam 136 may be tuned to match differing requirements such as different global standards (such as by through control of or selection of the power supply 114, by providing higher powered LEDs 124 for a particular wavelength or multiple LEDs 124 at one or more wavelengths, or the like) or may be filtered (e.g., electronically and/or mechanically filtered) to change the intensity of one or more of the LEDs 124 to match a given experimental need.

As shown, the light source 110 includes a controller 112 that controls operation of a sinusoidal power supply 116. The power supply 114 may take a number of forms but in some embodiments is made up of a plurality of LED drivers, $d_1$ to $d_n$, 116 that are controlled or configured to provide sinusoidal driving power at unique operating frequencies or ON/OFF frequencies. For example, the drivers, $d_1$ to $d_n$, 116 may each be sinusoidal frequency generators that operate at operating frequencies, $f_1$ to $f_n$. The number of drivers or sinusoidal power supplies 116 provided in supply 114 are generally selected to match (or exceed) the number of light sources or LEDs 124 in a light array 120 (e.g., the sinusoidal power supply means that the power of light coming out of each LED changes sinusoidally with time). Each of the LEDs 124 generates light 128 at a particular wavelength (or spectra bandwidth), $\lambda_1$ to $\lambda_n$, when it is powered by a corresponding one of the LED drivers 116, $d_1$ to $d_n$. The light 128 generated by the LEDs 124 of array 120 are focused onto a solar cell 140 as shown at 136 by an optical coupling 130, which may include optic fibers, lenses, mirrors, grating, an integrating sphere, or the like.

The LED array 120 is configured to include 2 or more of the LEDs 124 depending upon the experimental need or spectrum that is being simulated by the light source 110. For example, the light source 110 may be used to simulate a full spectrum corresponding to standard sunlight within the Earth's atmosphere (e.g., AM1.5). The number of LEDs 124 may be increased to a relatively large number such as up to 40 to 60 or more LEDs to provide more resolution but embodiments utilizing 20 or fewer LEDs 124 (such as about 10 or less) have proven effective in measuring QE for a solar cell 140. The LEDs 124 are typically selected for their ability to produce light at unique wavelengths, $\lambda_1$ to $\lambda_n$, that generally range from one to the other end of a spectrum of interest. For example, if the full spectrum of sunlight is the spectrum of interest, the LEDs 124 may be selected to provide light at wavelengths, $\lambda_1$ to $\lambda_n$, ranging from UV to IR light with substantially equal or other spacing between intermediate wavelengths provided by the LEDs 124 (e.g., the LEDs providing red, blue, green, yellow, and other light). In some cases, two or more LEDs 124 may be provided in the array 120 that generate at a particular wavelength to increase the intensity of that portion of the tested spectrum and this set of like-wavelength LEDs would typically be powered at the same operating frequency by one or more LED drivers 116 (or be operated at differing frequencies whose QE is later cumulated by the QE determination system 160). The specific form of the LED chosen is not limiting of the invention, and the LEDs 124 may be provided as a number of separate LED devices or as part of a single device or chip such as by using a multi-LED source available from Opto Technologies (e.g., the OTLA-0100 multi-LED source or the like) or another supplier/designer of multi-LED sources provided as a single device, chip, board, or the like. Each of the LEDs 124 may be of a like intensity or output rating or the LEDs 124 may vary in intensity or output rating to achieve a desired test beam 128 (e.g., one with greater intensity in a particular part of the spectrum).

The controller 112 may be used to trigger operation of the power supply 114 and its LED drivers 116 or, optionally, the power supply 114 may be configured such that the LED drivers 116 operate without control signals at a set or established operating frequency, $f_1$ to $f_n$. The operating or ON/OFF frequencies are selected based on a number of criteria. First, it is typically desirable that the period of each of the beam 128 (and resulting sinusoidal voltage waves) be longer than about a carrier life time or cell response time for the solar cell 140 (or the material of the solar cell 140). To this end, the operating frequency for the LEDs 124 is generally chosen such that the period is greater than about 1 millisecond, which is suitable for high quality solar cells (for low quality cells the period can be much shorter). The frequencies, $f_1$ to $f_n$, may take the form of 100 kHz, 135 kHz, and so on. This illustrates a second parameter for choosing the frequencies which is to avoid using multiples (i.e., avoid having frequencies that are divisible by other frequencies such as 100 kHz and 200 kHz). A third parameter or characteristic of the operating frequencies is that the longer the measurement or collection time used to determine QE the smaller the spacing or distance between two neighboring frequencies (e.g., 100 kHz and 150 kHz may be useful for neighboring frequencies when the collection period is 1 second but a much tighter spacing can be used if the collection period is greater such as 30 to 60 seconds or the like).

Varying the light source drive frequency beyond a characteristic cell response frequency (e.g., a light source drive period shorter than the material or device response period) in some cases may reveal material and cell information relating to material and device quality. For example, frequency analysis may be used to determining a minority carrier lifetime. A characteristic drive frequency at which the generated carriers cannot be collected in time before the next light pulse generates more carriers may be used to reveal/provide additional information about the material under test. Measurement of the generated carriers could be performed by use of generated current (e.g., QE), by conductance, or other measurement schemes.

The test beam 136 transmitted or dispersed by the light source 110 includes light 128 at multiple wavelengths, $\lambda_1$ to $\lambda_n$ from all the LEDs 120 (or a subset thereof chosen by powering only a subset of the LED drivers 116). The system 100 further includes a signal conditioning assembly 150 that is electrically connected via lines or connections 142 to the solar cell 140 such that the assembly 150 can measure or sense the current, I, flowing in the cell 140 in response to light waves in beam 136 (i.e., measure the carrier production in response to incident light 136). The assembly 150 may take a number of forms to provide the function of converting the analog current signal, I, into a digital voltage signal 159 that includes information that corresponds to sinusoidal waveforms corresponding to each operating frequency within the test beam 136. In the illustrated but not limiting example, the assembly 150 includes a current to voltage preamplifier 152 that functions to amplify the signal to a useful magnitude and also to convert current signal (or signals) into a voltage signal (or signals). The assembly 150 further includes an analog to digital (A/D) converter 158 that functions to convert the analog voltage signal (or signals) into a digital signal that includes a voltage signal corresponding to each operating frequency of the LED array. The A/D converter 158 may further function to create and display a graph of the resulting digital signal such as a graph that may be provided on the display of an oscilloscope showing sinusoidal waveforms resulting from graphing voltage over time for each of the operating frequencies (i.e., for each of the LEDs 124 operating at unique wavelengths, $\lambda_1$ to $\lambda_n$.

The system 100 further includes a QE determination system 160 and the digital signal 159 output from the A/D converter 158 is passed to the system 160 for determination of the QE based on the test beam 136. The system 160 is shown separate from the conditioning assembly 150 but all or portions of the assembly 150 may be incorporated into the system 160. For example, the A/D converter 158 may be provided as a card (e.g., a high-speed DAQ card) inserted into a computer providing the system 160. In many embodiments, the system 160 is provided as a computer such as a laptop, notebook, workstation, or other conventional computer system but in other cases the system 160 may be made up of one or more computing or electronic devices that communicate over direct communication links and/or over conventional data communication networks (such as wired or wireless data communication networks such as the Internet, an intranet, a LAN, a WAN, or the like).

As shown, the QE determination system 160 includes a frequency spectrum analyzer 180 for receiving and processing the digital signal 159. The analyzer 180 may be provided in the form of hardware and/or software with a typical implementation providing the analyzer 180 as a software module or algorithm that is run by a processor or CPU 162. More specifically, the analyzer 180 may take the form of a software module adapted to apply a Fast Fourier Transform (FFT) to the digital signal to reveal the power spectrum of the current as a function of frequency from each LED light 124. In other words, the FFT of analyzer 180 may be used to identify each voltage waveform for each operating frequency and determine an amplitude associated with each of these operating frequencies. The module 180 or a separate graphing module 170 may then be used to produce a graph of such amplitudes such as a graph with amplitudes on the y-axis and each of the operating frequencies on the x-axis. The graph 194 along with associated data 198 may be displayed in a graphical user interface (GUI) 192 on a monitor 190 in the system 160 and/or be printed out (or distributed electronically). The amplitudes and/or graphs may be stored in memory 164 as part of the QE measurements and related data 168. A user input/output device(s) 174 is included in the system 160 to allow a user to request particular graphs to be displayed such as by interacting with the GUI 192 with a mouse, by keyboard, via a touch screen, by voice commands, or the like. The user I/O 174 may also be used to request the amplitude graph be converted into a QE graph or for QE measurements to be determined or such processing may occur automatically.

The system 160 further includes a QE measurement/graphics module 184 that may take the form of a software module run by CPU 162 to convert the amplitudes associated with each operating frequency into a QE value for each operating frequency. The module 184 may then operate to create and display a QE graph that compares the QE values to each wavelength provided by the LED array 120 (i.e., presents a curve fitted to the QE values determined for each wavelength, $\lambda_1$ to $\lambda_n$, provided by the LEDs 124). The QE graph 194 may be displayed on the GUI 192 of monitor 190 along with associated data 198 (e.g., an identification of the cell 140, a listing of the QE values determined, and the like). The conversion of the amplitudes to QE values may be performed by the module 184 by retrieving QE conversion factors 166 previously stored in memory 164 or otherwise accessible by module 184 and multiplying these factors against the amplitudes. The conversion factors 166 are typically determined by testing a reference solar cell in a conventional manner and storing values useful for converting later determined amplitudes into QE values. In some applications, the QE measurement module 184 may also operate to account for spectra bandwidth of the LEDs 124 by using a mathematical algorithm such as Singular Value Decomposition (SVD), and such calibration/conversion would account for the fact that most LEDs do not provide a single-wavelength output but instead provide a small spectrum. The QE determination system 160 functions to rapidly determine the QE values and QE graph and typically can perform the QE determinations almost immediately upon the termination of a data collection or measurement period such as within a few seconds or less, which results in the QE measurement process requiring very little time to complete (e.g., from 20 minutes or more for conventional QE measurement to several seconds or less in some applications).

Figure 2:
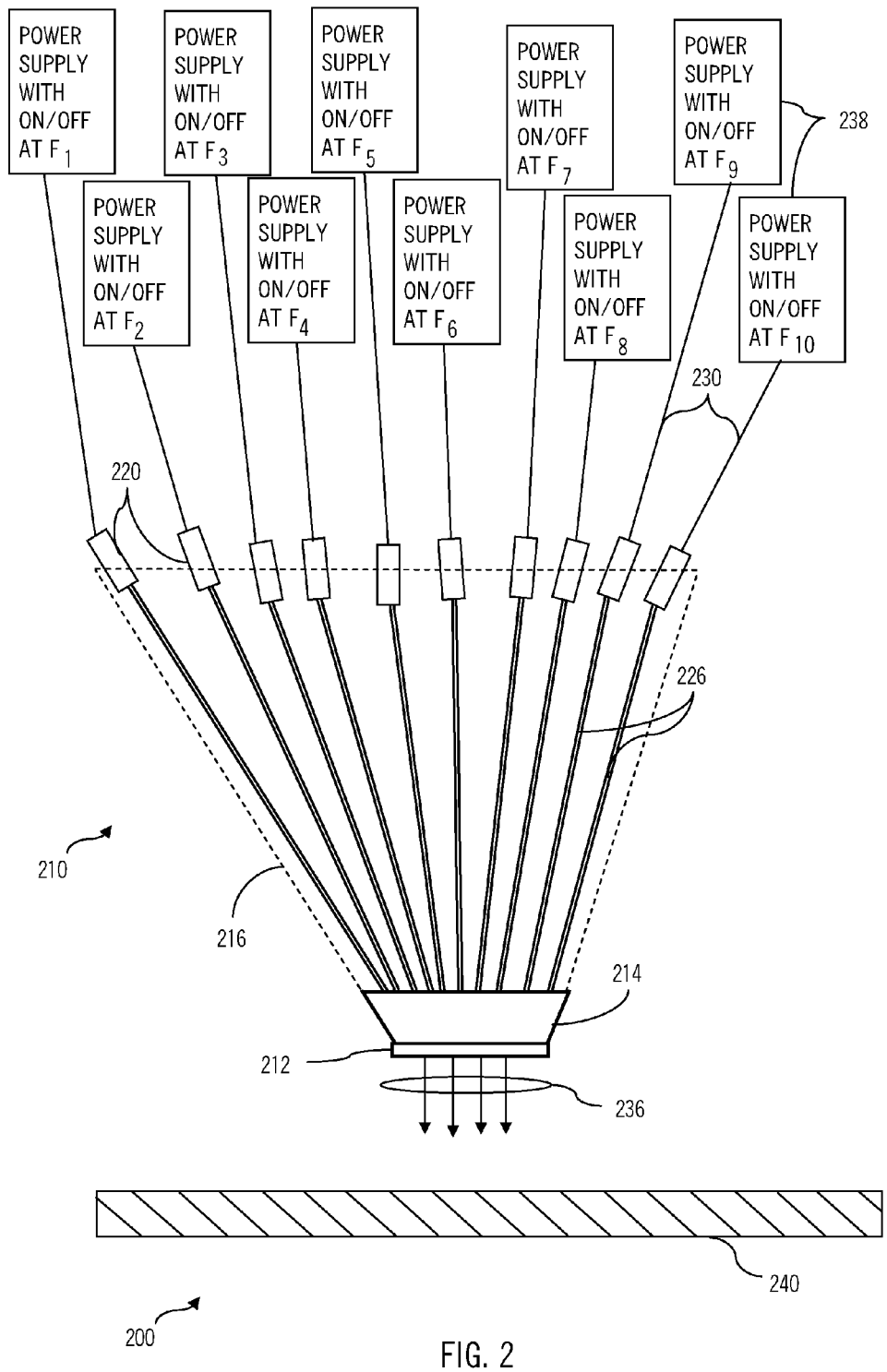
FIG. 2 illustrates a portion of a QE measurement system showing in more detail an exemplary embodiment of a light source using ten LEDs to provide a useful sampling of a spectrum and using ten power supplies or driver circuits each operating at a unique on/off or pulsing frequency.

FIG. 2 illustrates portions of another optical spectroscopy system 200 that is used to test a component 240 such as a solar cell. The system 200 includes an electrically-controlled light source 210 that produces light or a test beam 236 that includes a plurality of light beams having differing wavelengths and being provided at differing frequencies (e.g., operating or ON/OFF frequencies set by their associated power supply). As shown the light source 210 includes a lens 212 and/or a fiber coupling 214 that focuses all the light 236 onto a spot or area on the test component 240. The light source 210 includes ten LEDs 220 (although in other cases less or more may be used to represent a particular spectrum). The LEDs 220 are coupled to a like number of optical fibers 226 with a sleeve and/or fiber optic coupling 216. The bank, array, or bundle of LEDs 220 are driven by a like number of power supplies 238 via electrical connections 230. As discussed with reference to FIG. 1, the power supplies are preferably sinusoidal power supplies because this allows later processing of signals from component 240 with FFT modules or the like. Further, each of the LEDs 220 is powered individually at its own operating or ON/OFF frequency. As shown, this is done by providing a separate power supply 238 for each LED 220 and configuring each of these supplies 238 to operate at a unique operating frequency such as frequencies $f_1$ to $f_{10}$. In addition to being driven at differing frequencies, each of the LEDs 220 is selected for its ability to produce light at unique wavelengths along the test spectrum such as ten wavelengths ranging from about the UV to IR wavelengths.

Figure 3:
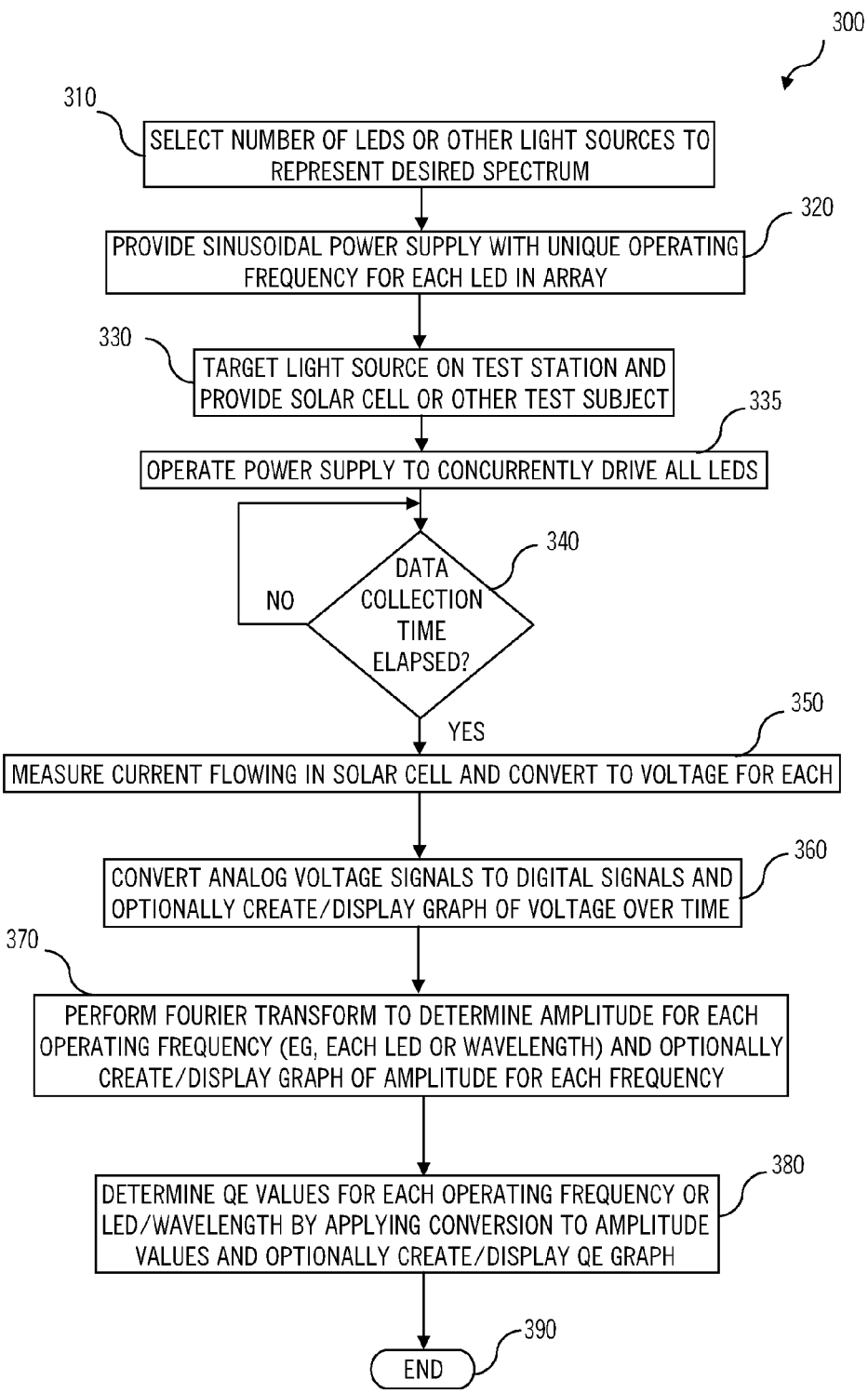
FIG. 3 illustrates a flow chart for an exemplary method of performing a QE measurement such as by using the devices shown in FIGS. 1 and 2.

FIG. 3 illustrates a QE determination method 300 such as may be implemented using the systems 100, 200 of FIGS. 1 and 2. The method 300 starts at 310 with a selection of a number of LEDs or other light sources that are to be used to represent a desired or test spectrum. For example, if the test spectrum is the full spectrum associated with sunlight at AM1.5, up to ten or more LEDs may be used to represent the spectrum. The LEDs are selected to provide light at wavelengths generally at each end of the spectrum as well as intermediate portions of the spectrum (e.g., UV and IR light as well as red, yellow, green, and blue light and "shades" therebetween). At 320, the method 300 continues with providing sinusoidal power supplies with unique operating frequencies for each of the LEDs in the LED array or bank. As discussed previously, the frequencies are typically selected to provide periods longer than the anticipated carrier life time of the solar cell, to avoid multiples, and to provide adequate spacing between neighboring frequency with adequacy varying with the magnitude of the measurement/collection time period. Also as discussed above, varying the light source drive frequency beyond a characteristic cell response frequency may be used to reveal material and cell information relating to material and device quality. At 330, the light source is targeted or focused upon a test station and a solar cell is positioned in the focus zone of the test station.

At 335, the power supplies are operated to concurrently drive all the LEDs at their respective operating frequencies (with "concurrently" meaning that each of the selected LEDs is provided power at least once during a data collection period and then operates according to its coded operating frequency). At 340, the method 300 continues with determining whether the data collection time period (such as up to 1 second or longer) has expired, and, if not, repeating step 340. If the collection time period has elapsed, the method 300 continues at 350 with measuring current flowing in the solar cell or determining the response of the cell to the light generated by the light source. The current associated with each LED (and its operating frequency) is converted into an analog voltage signal. At 360, the voltage signals are converted into digital voltage signals, and these voltage signals may be optionally graphed over time.

At 370, the digital voltage signals are subjected to a FFT or FFT-based algorithm to determine an amplitude for each operating frequency (e.g., each LED and associated light wavelength). Optionally, a graph may be created and displayed (or otherwise output or stored in memory) showing the amplitude on one axis and the frequency values (or a frequency ID) shown on a second axis. At 380, the method 300 continues with determining QE values for each of the operating frequencies by applying a conversion factor (and/or using SVD to account for each LED outputting a small spectrum of light rather than a single wavelength) to each amplitude value. Typically, a QE graph is also created and displayed that shows the QE values on the y-axis and wavelengths on the x-axis. The method 300 then ends at 390 (or is repeated for a next solar cell starting at 310 or at 330 if a similar cell is to be tested).

As discussed with reference to the embodiments of FIGS. 1-3, QE and optical spectroscopy techniques described herein generally involve replacing a white light source and a monochromator with an LED array with different color LEDs to represent a particular spectrum. The LEDs are powered with power supplies each operating at a different frequency that allows the response of a tested object such as a solar cell to the light from each LED to be identified. To this end, the power sources are often sinusoidal power sources because this allows a FFT to be used more effectively to process the response signals from the test object or solar cell to get a single value (or small range or spike) for each operating frequency without harmonic frequencies. The amplitude or single value output by the FFT for each frequency is readily converted to a QE value by applying a constant or conversion factor (e.g., as can be obtained by conventional techniques through the use of a reference test object or reference PV cell).

In some cases, such as testing multi junction solar cells, it may be useful to be able to shut off different LEDs (such as providing a test beam with only one or two colors rather than the "entire" spectrum as represented by all LEDs in the array), and this may be achieved by operating a controller such as controller 112 of FIG. 1 to selectively operate drivers 116 in power supply 114. In other cases, it may be useful to control the intensity or power level of specific LEDs in the LED array of a light source such as to match a particular spectrum (e.g., to match the Earth's sunlight, to match light intensities in differing atmospheres such as differing locations on Earth, to match spectrums in space or on other planets (e.g., where UV and blue may have higher intensities than on Earth)). Such spectrum-matching may be done by operation of a controller such as controller 112 to increase power supplied to a particular LED 124 via an LED driver 116 typically without requiring removal or modification of the LED array 120 or driver bank 116. Hence, in most light sources described herein, the test beam (such as beam 136 of FIG. 1) can be tuned by selectively powering the LEDs in the array (e.g., in some spectrums it may be desirable to not power on certain LEDs or to power on two or more LEDs of a particular color) and powering each of the LEDs with a selectable/tunable power level or intensity to obtain a desired spectrum in the output test beam. Further, a single solar cell may be tested for its response to two or more spectrums simply by tuning the controller to operate the LED array in a particular manner (e.g., by using less than all of the LEDs and/or increasing or decreasing the intensity of one or more of the LEDs).

While a number of exemplary aspects and embodiments have been discussed above, those of skill in the art will recognize certain modifications, permutations, additions, and sub-combinations thereof. It is therefore intended that the following appended claims and claims hereafter introduced are interpreted to include modifications, permutations, additions, and sub-combinations to the exemplary aspects and embodiments discussed above as are within their true spirit and scope. The above description stresses the use of the multiple wavelength light source for making fast QE measurements, but it will be understood that the electronically-controlled light source is useful in many other optical spectroscopy applications and particularly those requiring a high throughput such as may be found on a manufacturing line or the like. For example, the light source may be used to test photo diodes or other components for their response to a test beam. It may also be used as a light source for techniques such as surface photovoltage, transmission and reflection of a material.

Figure 4:
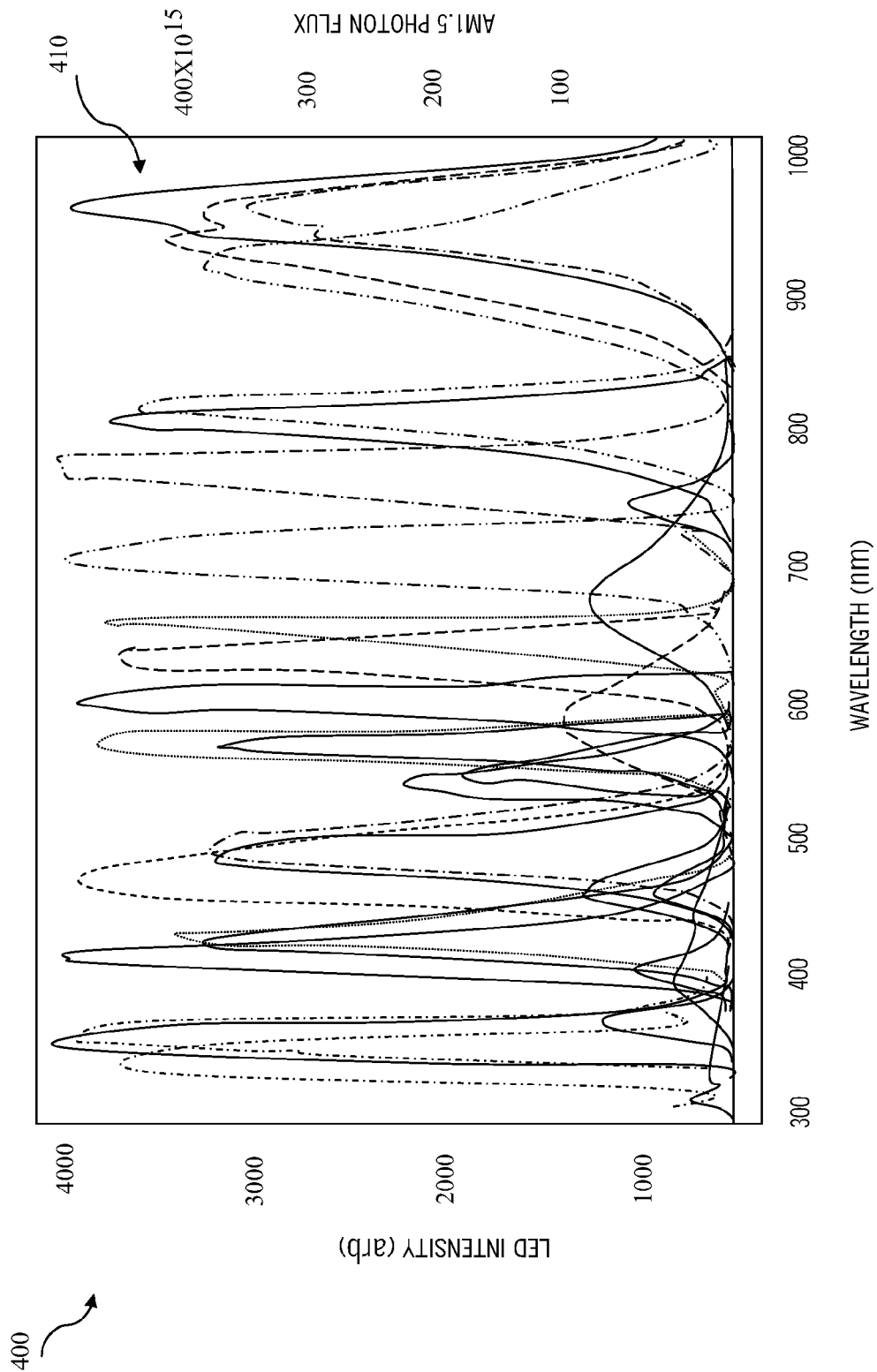
FIG. 4 is a graph showing wavelength relative to LED intensity for an example of an electronically controlled, full-spectrum light source (ECLS) with 58 LEDs that may be used in a QE determining system such as the systems of FIGS. 1 and 2.

As will be appreciated from the above discussion, high QE measurement speed is achieved in part by parallel processing of information from a multitude of spectral channels encoded in modulation frequency bands. This is achieved in some systems described herein by an electronically controlled, full-spectrum light source (ECLS) that allows individual on/off frequency control over specified spectral ranges. For example, the ECLS may be an electronically controlled array of LEDs that each have a unique spectral emission (or two or more may be provided at a particular emission/wavelength. FIG. 4 illustrates a wavelength versus LED intensity graph 400 with data for each LED in one embodiment of an ECLS. The spectra 410 of the individual LEDs (e.g., 58 LEDs in this particular example) are plotted with the right axis being the AM1.5 solar spectrum. In this example, a slight overlap in wavelengths is provided such that the ECLS spectrum 410 covers a typical solar cell spectral response (e.g., 300 nm to 1200 nm). In operation, a sine-wave generator and an amplifier (both of which are controlled by a computer running software/programs as discussed above) power each LED in the ECLS. This arrangement allows for each LED to operate at a unique frequency and/or intensity. Light from the LEDs in the ECLS is focused to a common area by lenses, mirrors, fiber optics, or the like.

The system may be labeled or termed a real-time quantum efficiency (RTQE) system. The RTQE system works by focusing light from the ECLS onto a solar cell or other test subject with each LED in the ECLS switched on and off at a unique, specified drive frequency. Typically, all of the LEDs in the array are driven simultaneously (or concurrently as defined herein). The drive frequency of each LED may be set below the inverse response time of the solar cell and typically is not a multiple of another one of the LED drive frequencies. The response of the cell or the AC current versus time signal may be sent through a current-to-voltage preamplifier after which it may be recorded by a computer-based analog-to-digital converter (e.g., DAQ card or the like). The digitized signal is then Fourier transformed to determine the power spectrum. The power spectrum separates out the frequency components of the total signal that exactly or substantially match the specified drive frequencies of the LEDs in the ECLS. The amplitude of the power spectrum frequency components are directly related to the current generated in the cell from the light of the corresponding LED. Calibration of the system may be done with a reference cell by scaling the known current to the amplitude of each frequency component in the power spectrum.

Figure 5:
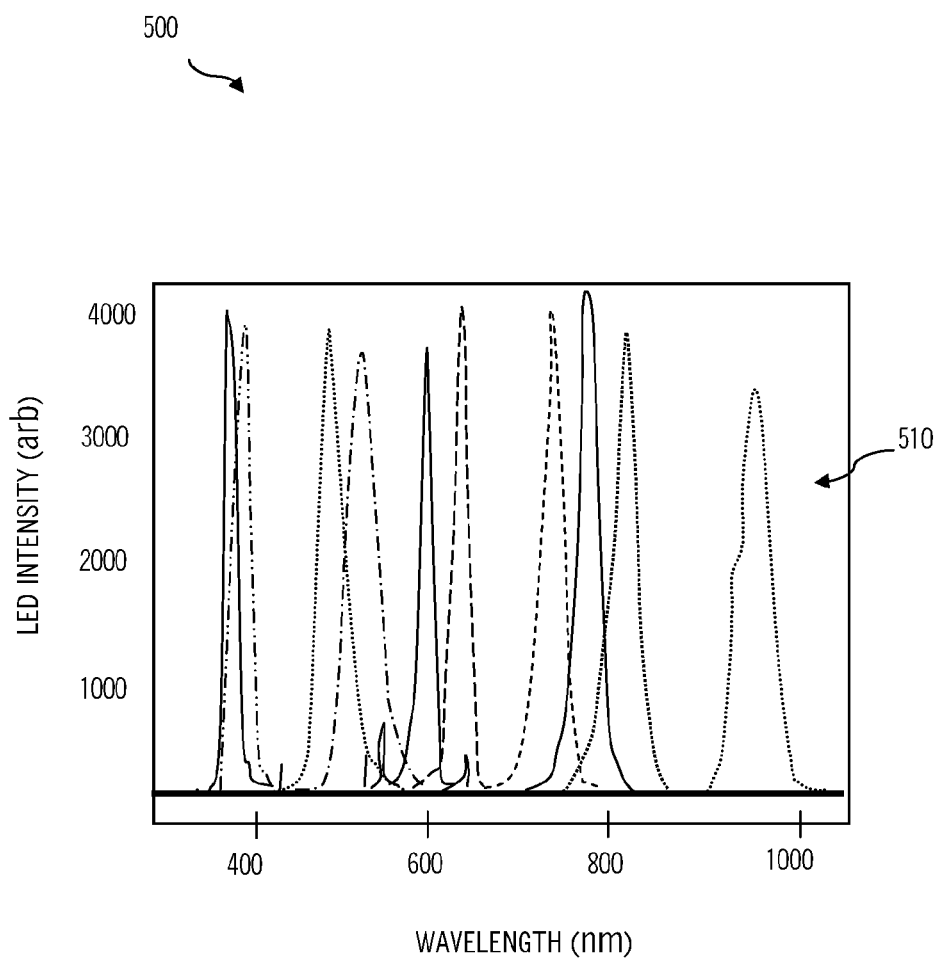
FIG. 5 is a graph similar to FIG. 4 for an ECLS embodiment that uses 10 LEDs to span the spectral response range of C—Si.
Figure 6:
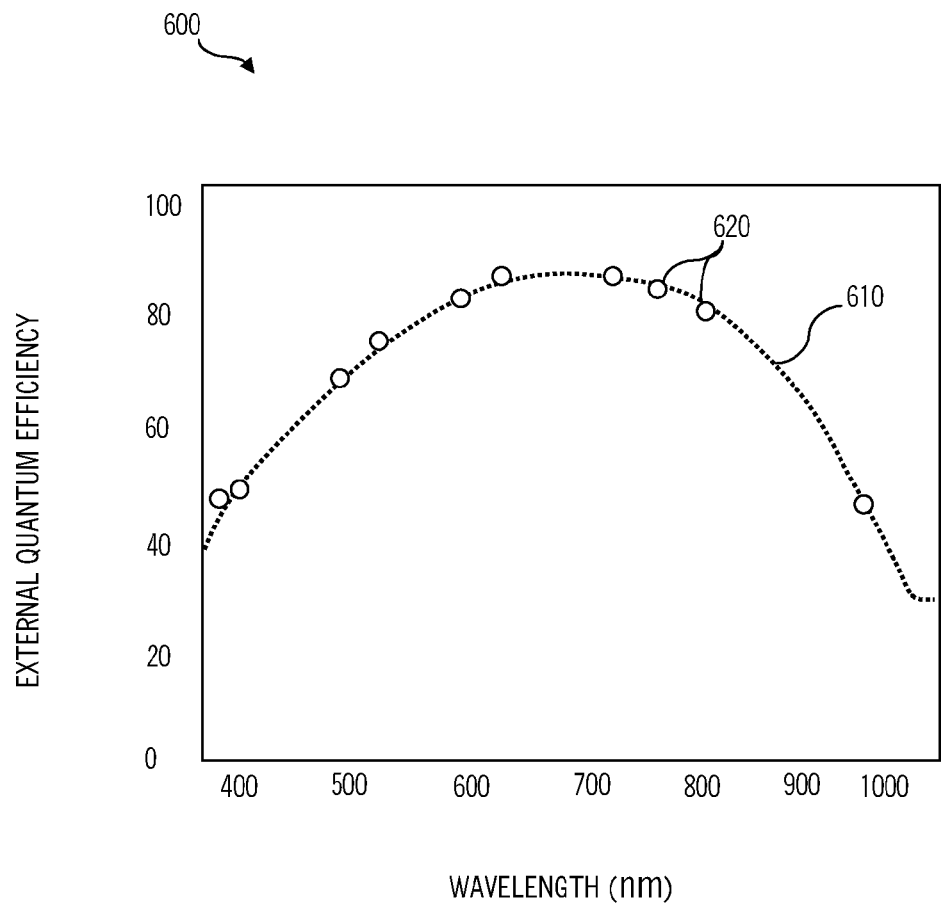
FIG. 6 is a graph that may be provided on a monitor or on a print out by use of the ECLS of FIG. 5 in a system (such as the systems of FIGS. 1 and 2) to plot/display graphically QE data relative to the wavelengths of the light source.

In another ECLS embodiment, 10 LEDs were used to provide the functionality of a modulated light source. FIG. 5 illustrates a graph 500 of LED intensity relative to light source component wavelength for a tested 10 LED ECLS as shown with intensity indications 510 for each LED. In this case, the 10 LEDs were chosen so as to provide light at wavelengths that span the spectral response range of C—Si, while it is understood that other LEDs or modulated sources may be utilized to provide coverage or to span a desired spectral response range. As discussed with reference to the systems of FIGS. 1 and 2 and the method of FIG. 3, a computer program may continuously record the data, apply the calibration algorithm, generate graph data, and create a QE graph. FIG. 6 illustrates a QE graph 600 with dashed line 610 showing QE values as measured by a traditional QE system over a particular wavelength or spectral response range, which is shown to provide agreement with the 10 QE values 620 corresponding to the 10 LEDs used in the tested modulated light supply. The QE graph 600 is obtained by assigning the current generated for each drive frequency to the peak wavelength of the associated LED. In one embodiment, the update rate of the QE graph is determined by the capture rate of the analog-to-digital converter and by the integration time of the power spectrum. Typical graphical update rates are less than about 1 second.

The multiple wavelength light source described above may be used for a variety of other experiments and/or in other applications. For example, the light source may be used to provide a small focal spot, white light source for J/V curves on solar cells, which may allow spatially-resolved J/V and QE curves to be generated. Further, the light source may be configured, such as with a power supply controller, to provide quick adjustment of standard spectrums produced for used in solar cell and other tests. By varying the intensities of the LEDs in this manner, one can match any spectrum on a tested device quickly. Additionally, the light source may be coupled to an NSOM machine for high resolution, spatial QE measurements. In other applications, the light source may be coupled to a Kelvin probe for testing affects of different wavelengths on a sample's work function. The light source may also be coupled to a capacitance set up to make spectrally-resolved, photocapacitance measurements. The light source may also be used to measure spectrally-resolved transmittance and reflectance from a sample.

Further, while LED arrays have been described in detail above, other light sources may be used to provide the desired input light or portions of a spectrum, and the above description and following claims are intended to cover any light source that provides the claimed functionality of the light source. For example, the LEDs in the above description and examples may be replaced (or supplemented) by electronically-controlled, full spectrum light sources that are filtered to provide a narrow spectrum of light. As a further example, solid state laser diodes or other laser sources can be used with the same multiplexing scheme. These laser sources provide even narrower individual spectral wavelength ranges than LEDs, although they may be more expensive, and complete coverage of the relevant solar spectral range may not be readily available. Any combination of LED or other sources which provide an electronically controlled full- or partial-spectrum light source is included in the following claims. Additionally, a white-light source may be used to provide the light source functionality described above such as a white-light source that is properly split to provide chromatic dispersion and also filtered to provide modulation. One embodiment may use a grating or prism to disperse the light and filters, micromirror digital light processors (e.g., as used in DLP devices), or other electronic filtering (such as LCDs) may be used to provide desired modulation.

The invention claimed is:

1. A light source for use in testing of solar cells and other optical spectroscopy applications, comprising:
    an array of light sources emitting light corresponding with a differing portion of a test spectrum; and
    a power supply comprising modulated power supplies coupled to each of the light sources, wherein the modulated power supplies operate at unique operating frequencies to drive sets of one or more of the light sources at the differing portions of the test spectrum; wherein the unique operating frequencies are not multiples of each other and wherein the modulated power supplies are configured to selectively vary power levels delivered to select an intensity of the light emitted from each of the LEDS, whereby the test spectrum can be matched to a particular spectrum.

2. The light source of claim 1, wherein the modulated power supplies comprise one or more of sinusoidal power supplies and square wave power supplies.

3. The light source of claim 1, wherein the test spectrum comprises the full spectrum and the array of light sources comprises two or more light emitting diodes (LEDs) configured to emit light ranging from UV light to IR light.

4. The light source of claim 1, wherein modulated power supplies are configured such that one or more power supplies may be turned on in dc mode and one or more power supplies may be turned on in a modulated mode.

5. The light source of claim 2, wherein the unique operating frequencies of the modulated power supplies are selected according to a cell response time of a solar cell under test such that the solar cell under test is capable of responding to the operating frequencies.

6. The light source of claim 3, further comprising an optical coupling connected to the array of LEDs configured to focus the light emitted from the LEDs into a test beam.

7. An apparatus for measuring full spectrum quantum efficiency (QE) of a solar cell, comprising
   a light source emitting light corresponding with differing portions of a test spectrum and an optical coupling focusing the emitted light into a test beam;
   a signal conditioning assembly receiving analog current signals responsive to the test beam striking the solar cell and converting the analog current signals into digital voltage signals; and
   a QE determination system in communication with the signal conditioning assembly comprising a processor running a QE measurement module determining a QE value corresponding to each of the differing portions of the test spectrum based on the digital voltage signals, wherein all wavelengths of light are applied simultaneously to the solar cell, wherein the analog current signal responses of the solar cell from various wavelengths are collected simultaneously.

8. The apparatus of claim 7, wherein the light source comprises an array of light emitting diodes (LEDs) each configured to emit light corresponding to one of the differing portions of the test spectrum.

9. The apparatus of claim 8, wherein the light source further comprises a power source comprising a modulated power supply coupled to each of the LEDs, wherein each of the modulated power supplies is configured to operate at a unique operating frequency to drive each of the LEDs.

10. The apparatus of claim 9, wherein the QE determination system further comprises a frequency spectrum analyzer configured to process the digital voltage signals to generate values with amplitudes associated with each of the operating frequencies.

11. The apparatus of claim 10, wherein the frequency spectrum analyzer comprises a module configured to be run by the processor to apply a Fast Fourier Transform (FFT) algorithm to the digital voltage signals.

12. The apparatus of claim 11, wherein the QE measurement module is configured to determine the QE values by applying a conversion factor to the FFT algorithm amplitudes output by the module for the operating frequencies.

13. The apparatus of claim 8, wherein the test spectrum comprises the full spectrum and the array of the LEDs are configured to emit light ranging from UV light to IR light.

14. A method of performing optical spectroscopy of a test subject, comprising:
   providing a light source powered by a modulated power supply;
   positioning the test subject proximate an output of the light source;
   operating the light source to emit light corresponding with a plurality of wavelengths in a test spectrum, wherein the emitted light is focused in a test beam upon a surface of the test subject; and
   determining a plurality of test result values responsive to the test beam striking the surface of the test subject wherein the determining of the test result values comprises converting analog current signals generated by the test subject into digital voltage signals and determining a quantum efficiency (QE) value corresponding to each of the wavelengths in the test spectrum based on the digital voltage signals.

15. The method of claim 14, wherein the determining of the QE values comprises applying a Fast Fourier Transform (FFT) to the digital voltage signals.

16. The method of claim 14, wherein the light source comprises a plurality of light emitting diodes (LEDs) with one or more of the LEDs emitting light at each of the wavelengths.

17. The method of claim 16, wherein the modulate power supply powers the LEDs associated with each of the wavelengths at a differing operating frequency and wherein the differing operating frequencies are not multiples of each other.

18. The method of claim 17, further comprising varying the differing operating frequencies beyond a characteristic cell response frequency for the test subject and gathering data related to a material or a device quality of the test subject.

19. An optical spectroscopy system configured to perform ultra-fast determinations or measurements of characteristics of a test object, the optical spectroscopy system comprising
   a light source configured to emit light corresponding with differing portions of a test spectrum and an optical coupling configured to focus emitted light into a test beam;
   a signal conditioning assembly configured to receive analog current signals responsive to the test beam striking the test object and converting analog current signals into digital voltage signals; and
   a quantum efficiency (QE) determination system in communication with the signal conditioning assembly, the QE determination system comprising a processor configured to run a QE measurement module, wherein the QE measurement module is configured to determine a QE value corresponding to each of the differing portions of the test spectrum based on the digital voltage signals, wherein all wavelengths of light are applied simultaneously to the test object, wherein the analog current signal responses of the test object from various wavelengths are collected simultaneously.

20. The apparatus according to claim 19, wherein the light source comprises an array of light emitting diodes (LEDs) each emitting light corresponding to one of the differing portions of the test spectrum.

21. The apparatus according to claim 20, wherein the light source further comprises a power source comprising a modulated power supply coupled to each of the LEDs, wherein each of the modulated power supplies operates at a unique operating frequency to drive the LEDs.

22. The apparatus according to claim 21, wherein the QE determination system further comprises a frequency spectrum analyzer processing the digital voltage signals to generate values with amplitudes associated with each of the operating frequencies.

23. The apparatus according to claim 22, wherein the frequency spectrum analyzer comprises a module run by the processor to apply a Fast Fourier Transform (FFT) algorithm to the digital voltage signals.

24. The apparatus according to claim 23, wherein the QE measurement module determines the QE values by applying a conversion factor to the FFT algorithm amplitudes output by the module for the operating frequencies.

25. The apparatus according to claim 20, wherein the test spectrum comprises the full spectrum and the array of LEDs are configured to emit light ranging from UV light to IR light.

26. The apparatus according to claim 19, wherein the test object comprises a single junction solar cell or multi junction solar cells.

* * * * *